United States Patent
Maji et al.

(10) Patent No.: US 10,229,319 B2
(45) Date of Patent: Mar. 12, 2019

(54) SHIPPING CONTAINER COMPLIANCE CHECK AND ASSOCIATED SEARCH WITH A PERSONAL IMAGING SYSTEM

(71) Applicant: International Business Machines Corporation, Armonk, NY (US)

(72) Inventors: Arindam Maji, Kolkata (IN); Subhas Maji, Kolkata (IN); Sarbajit K. Rakshit, Kolkata (IN); Surajit Ray, Durgapur (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/184,466

(22) Filed: Jun. 16, 2016

(65) Prior Publication Data

US 2017/0364748 A1    Dec. 21, 2017

(51) Int. Cl.
| | |
|---|---|
| *G06K 9/00* | (2006.01) |
| *G01B 21/16* | (2006.01) |
| *G06K 9/62* | (2006.01) |
| *G06Q 10/08* | (2012.01) |

(52) U.S. Cl.
CPC ......... *G06K 9/00671* (2013.01); *G01B 21/16* (2013.01); *G06K 9/00496* (2013.01); *G06K 9/6215* (2013.01); *G06Q 10/083* (2013.01)

(58) Field of Classification Search
None
See application file for complete search history.

(56) References Cited

U.S. PATENT DOCUMENTS

| 8,669,861 B1 | 3/2014 | Meyers |
| 2010/0127871 A1 | 5/2010 | Pontin |
| 2013/0342653 A1 | 12/2013 | McCloskey et al. |

FOREIGN PATENT DOCUMENTS

WO    2014149948 A1    9/2014

OTHER PUBLICATIONS

Zhu et al. "Stereo Matching and 3D Visualization for Gamma-Ray Cargo Inspection", Applications of Computer Vision, 2007. WACV '07, Feb. 2007.
Ginters et al. "Markerless outdoor AR-RFID solution for logistics", 2013 International Conference on Virtual and Augmented Reality in Education, 2013.
"Truck and container loading software EasyCargo | Load efficiently", retrieved from http://www.easycargo3d.com/; as early as May 2014.
Khoo, Wai, "3D Measurements and Visualization for Gamma-Ray Cargo Inspection", Student Research Articles, vol. 2, May 2009.
Glockner et al. "Augmented Reality in Logistics Changing the way we see logistics—a DHL perspective", DHL Customer Solutions & Innovation; 2014.
McNamara J., "10 Steps to Load, Stow and Secure a Freight Container", retrieved from http://www.joc.com/content/10-steps-load-stow-and-secure-freight-container; Jan. 2009.
Kolarovszki, P. "Research of Readability and Identification of the Items in the Postal and Logistics Environment", Transport and Telecommunication, 2014, vol. 1 No. 3, 196-208.

*Primary Examiner* — Leon Viet Q Nguyen
(74) *Attorney, Agent, or Firm* — Brown & Michaels, PC; David Woycechowsky

(57) ABSTRACT

Determining positions of parcels within a container to create a visualization of the position of the parcels relative to and within the container. The visualization includes whether the packaging of the parcels within the container violates a defined packing policy.

20 Claims, 11 Drawing Sheets

US 10,229,319 B2

SHIPPING CONTAINER COMPLIANCE CHECK AND ASSOCIATED SEARCH WITH A PERSONAL IMAGING SYSTEM

BACKGROUND

The present invention relates to a personal imaging system, and more specifically to shipping container compliance check and associated search using a personal imaging system.

Cargo ships carry multiple containers, with each of the containers being loaded with multiple parcels. Space within each of the containers, as well as space on the cargo ship for the containers, is limited and therefore the parcels within the container need to be packed together efficiently to avoid wasting space, while distributing the load of all of the parcels within the container equally. Additionally, when packing a container, certain types of parcels may not be able to be close to each other or must be packed in a certain way within the containers.

Personal imaging systems are wearable computers. Personal imaging systems may use an optical head-mounted display (OHMD) or computerized internet-connected glasses with transparent heads-up display (HUD) or an augmented reality (AR) overlay that has the capability of reflecting projected digital images, which can be seen through by the user.

The personal imaging system may collect information from internal or external sensors. Additionally, the personal imaging system may control, or retrieve data from, other instruments or computers, for example through wireless radio technologies. The personal imaging system may also contain a storage device.

SUMMARY

According to one embodiment of the present invention, a method of determining positions of parcels within a container is disclosed. The parcels and the container each comprising at least two sensors and a sensor reader. The method comprising the steps of: a computer obtaining signal strengths from all of the sensors via the sensor readers of the parcels loaded into the container; the computer obtaining the signal strengths from all of the sensors on container walls of the container; the computer comparing the signal strengths of each parcel to adjacent parcels and to the signal strengths of the sensors on the walls of the container; the computer identifying a position of the parcels within the container; the computer creating a visualization of the position of the parcels within the container; and the computer sending the visualization to a user.

According to another embodiment of the present invention, a computer program product for determining positions of parcels within a container is disclosed. The parcels and the container each comprising at least two sensors and a sensor reader. A computer comprising at least one processor, one or more memories, one or more computer readable storage media is present and the computer program product comprises a computer readable storage medium having program instructions embodied therewith. The program instructions executable by the computer to perform a method comprising: obtaining, by the computer, signal strengths from all of the sensors via the sensor readers of the parcels loaded into the container; obtaining, by the computer, the signal strengths from all of the sensors on container walls of the container; comparing, by the computer, the signal strengths of each parcel to adjacent parcels and to the signal strengths of the sensors on the walls of the container; identifying, by the computer, a position of the parcels within the container; creating, by the computer, a visualization of the position of the parcels within the container; and sending, by the computer, the visualization to a user.

According to another embodiment of the present invention, a computer system for determining positions of parcels within a container. The parcels and the container each comprising at least two sensors and a sensor reader. The computer system comprising a computer comprising at least one processor, one or more memories, one or more computer readable storage media having program instructions executable by the computer to perform the program instructions comprising: obtaining, by the computer, signal strengths from all of the sensors via the sensor readers of the parcels loaded into the container; obtaining, by the computer, the signal strengths from all of the sensors on container walls of the container; comparing, by the computer, the signal strengths of each parcel to adjacent parcels and to the signal strengths of the sensors on the walls of the container; identifying, by the computer, a position of the parcels within the container; creating, by the computer, a visualization of the position of the parcels within the container; and sending, by the computer, the visualization to a user.

DETAILED DESCRIPTION

In an illustrative embodiment, it is recognized that the methods, computer program product and computer system may be implemented through a personal imaging system of a user which collects information from internal or external sensors. The personal imaging system may be on a personal imaging device. The personal imaging system contains a storage device or repository. The personal imaging system can receive information from another computer, such as a server computer through a network or from a network data processing system. A processor, connected to the internal and external sensors, executes a program regarding information detected by the sensors or received by the personal imaging system.

Figure 1:
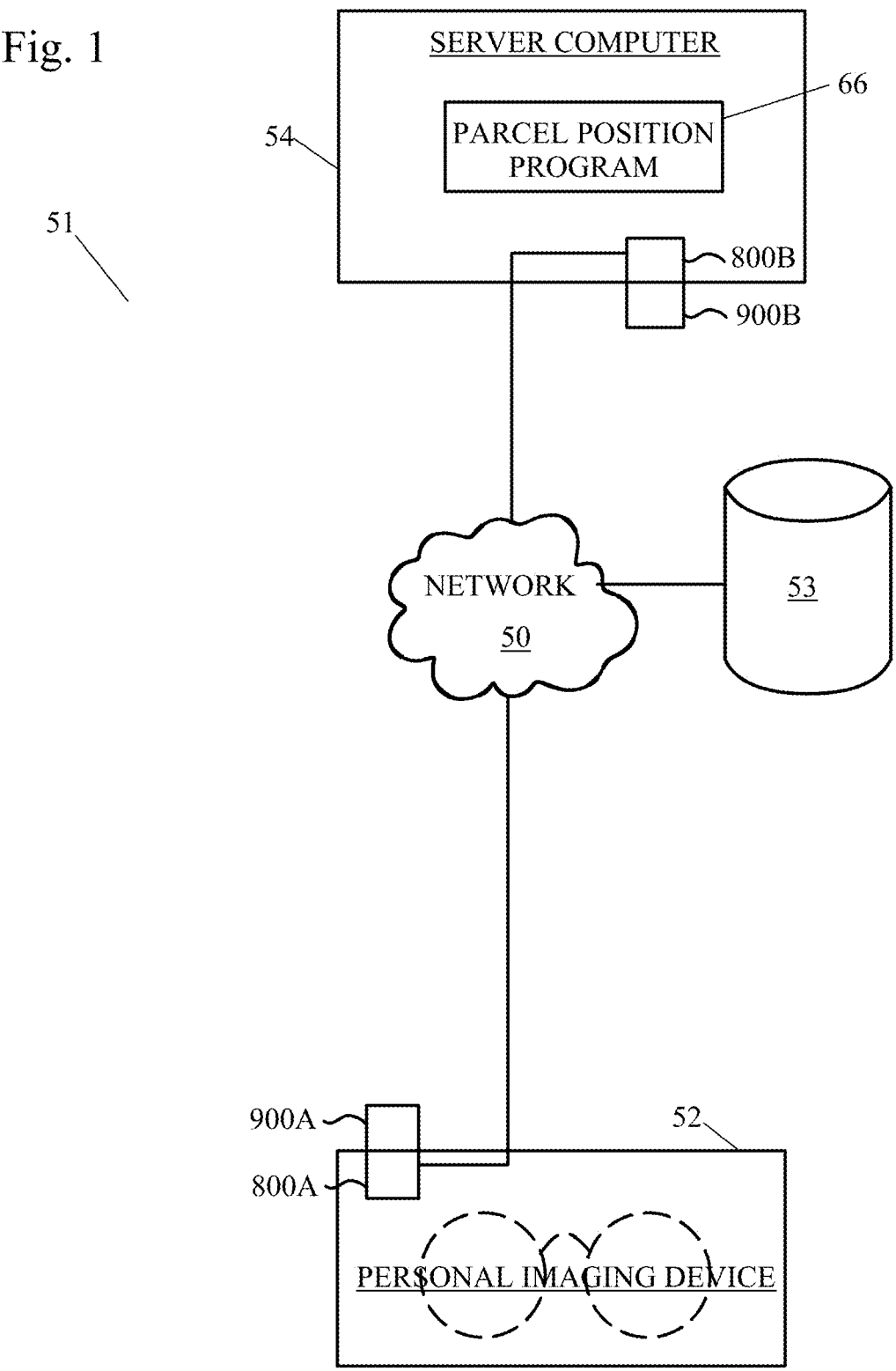
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Figure 2:
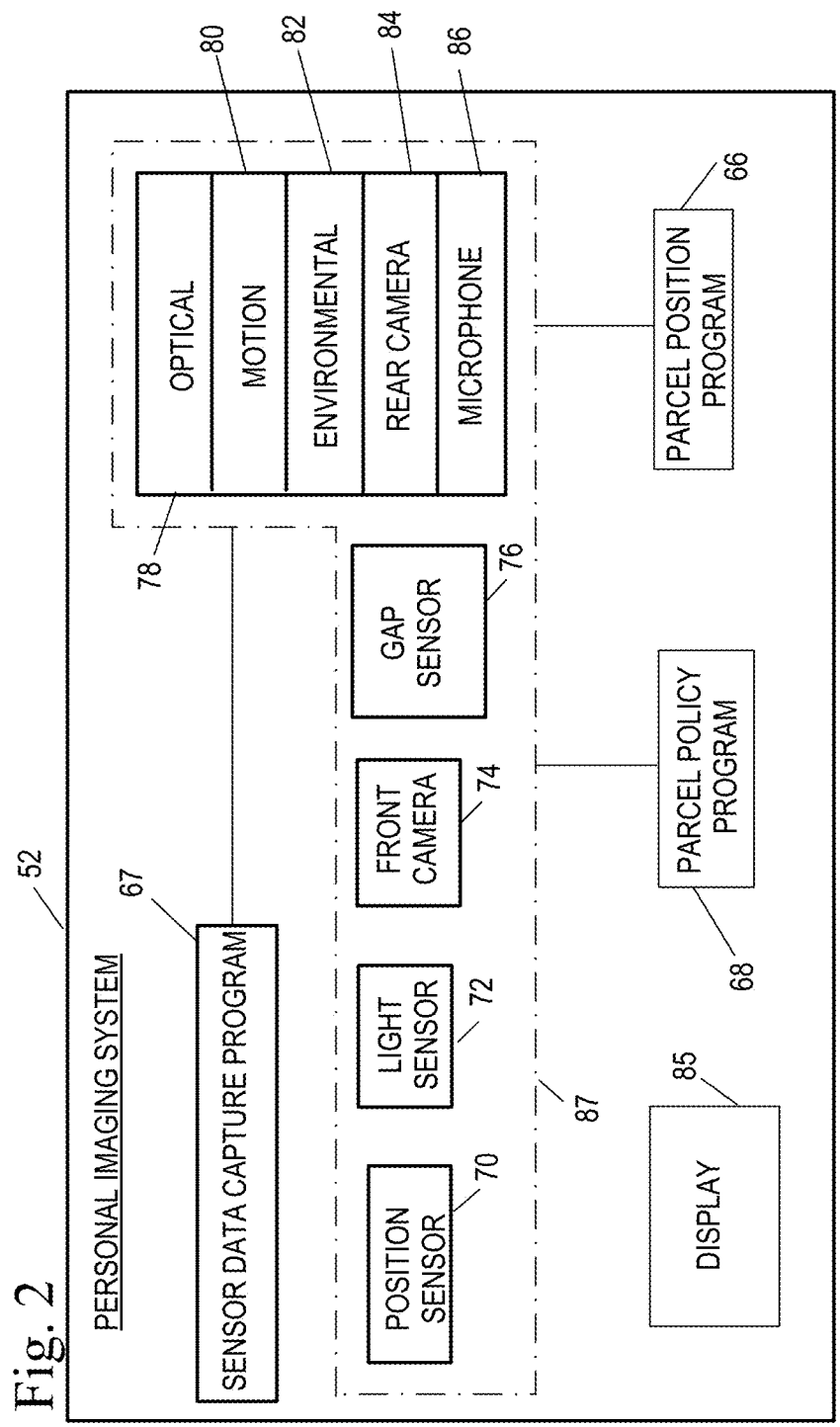
FIG. 2 shows a schematic of components of the personal imaging device.

Referring to FIGS. 1 and 2, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a personal imaging device 52, a repository 53, and a server computer 54 connect to network 50. In other exemplary embodiments, network data processing system 51 may include additional client or device computers, storage devices or repositories, server computers, and other devices not shown.

The personal imaging device 52 may be, for example a personal imaging device with a personal imaging system.

The personal imaging device 52 may contain an interface, which may accept commands and data entry from a user. The user may be a field officer of a shipping company or a field officer who checks the containers and the loading or parcels within the container. The interface can be, for example, a command line interface, a graphical user interface (GUI), a natural user interface (NUI) or a touch user interface (TUI). The personal imaging device 52 preferably includes a parcel policy program 68 and a parcel position program 66. Alternatively, the parcel policy program 68 may include the parcel position program 66. While not shown, it may be desirable to have the parcel position program 66 and the parcel policy program 68 present on the server computer 54. While a personal imaging device is shown, other devices may be used in conjunction with the personal imaging device, such as a mobile device.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 shows a schematic of a personal imaging system 52. The personal imaging system 52 includes a display 85, a parcel position program 66, a parcel policy program 68, and a plurality of sensors 87. The sensors 87 may include, but are not limited to, a position sensor 70, a light sensor 72, a front camera 74, a gap sensor 76, an optical sensor 78, a motion sensor 80, an environmental sensor 82, a rear camera 84, and a microphone 86. The position sensor 70 may include a gyroscope.

The parcel position program 66, sensor data capture program 67, and the parcel policy program 68 all interface with the plurality of sensors 87. The personal imaging device 52 may be worn by a user enforcing a packing policy for a container, enforcing a packing policy for a cargo vessel, or checking that the container was packed correctly either before shipment to a destination or when the container reaches the destination.

Figure 8:
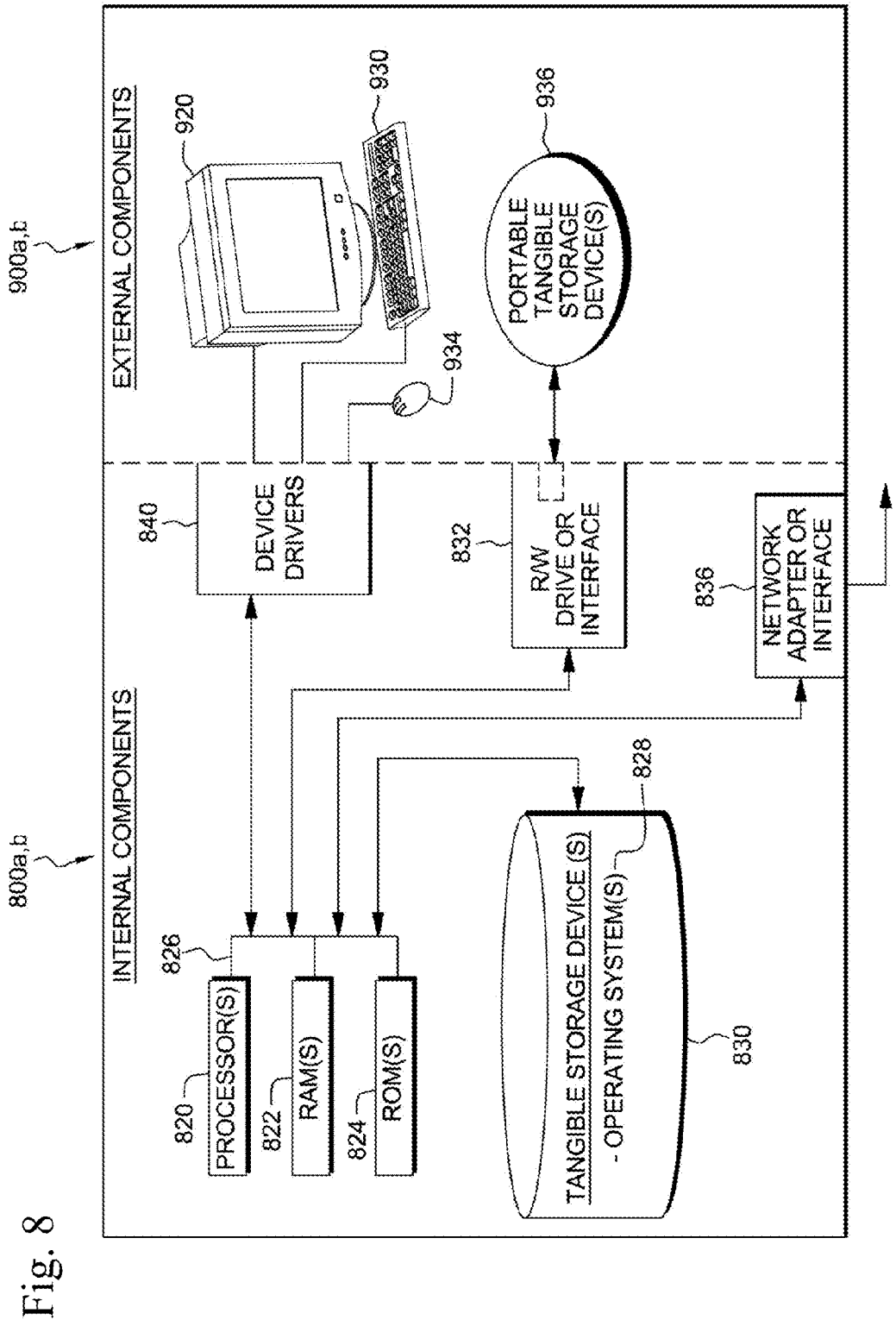
FIG. 8 illustrates internal and external components of a mobile device and a personal imaging device and a server computer in which illustrative embodiments may be implemented.

The personal imaging device 52 includes a set of internal components 800a and a set of external components 900a, further illustrated in FIG. 8.

Server computer 54 includes a set of internal components 800b and a set of external components 900b illustrated in FIG. 8. In the depicted example, server computer 54 provides information, such as boot files, operating system images, and applications to the personal imaging device 52. Server computer 54 can compute the information locally or extract the information from other computers on network 50. The server computer 54 may contain the parcel position program 66 and policies specific to how a container should be packed.

Figure 3:
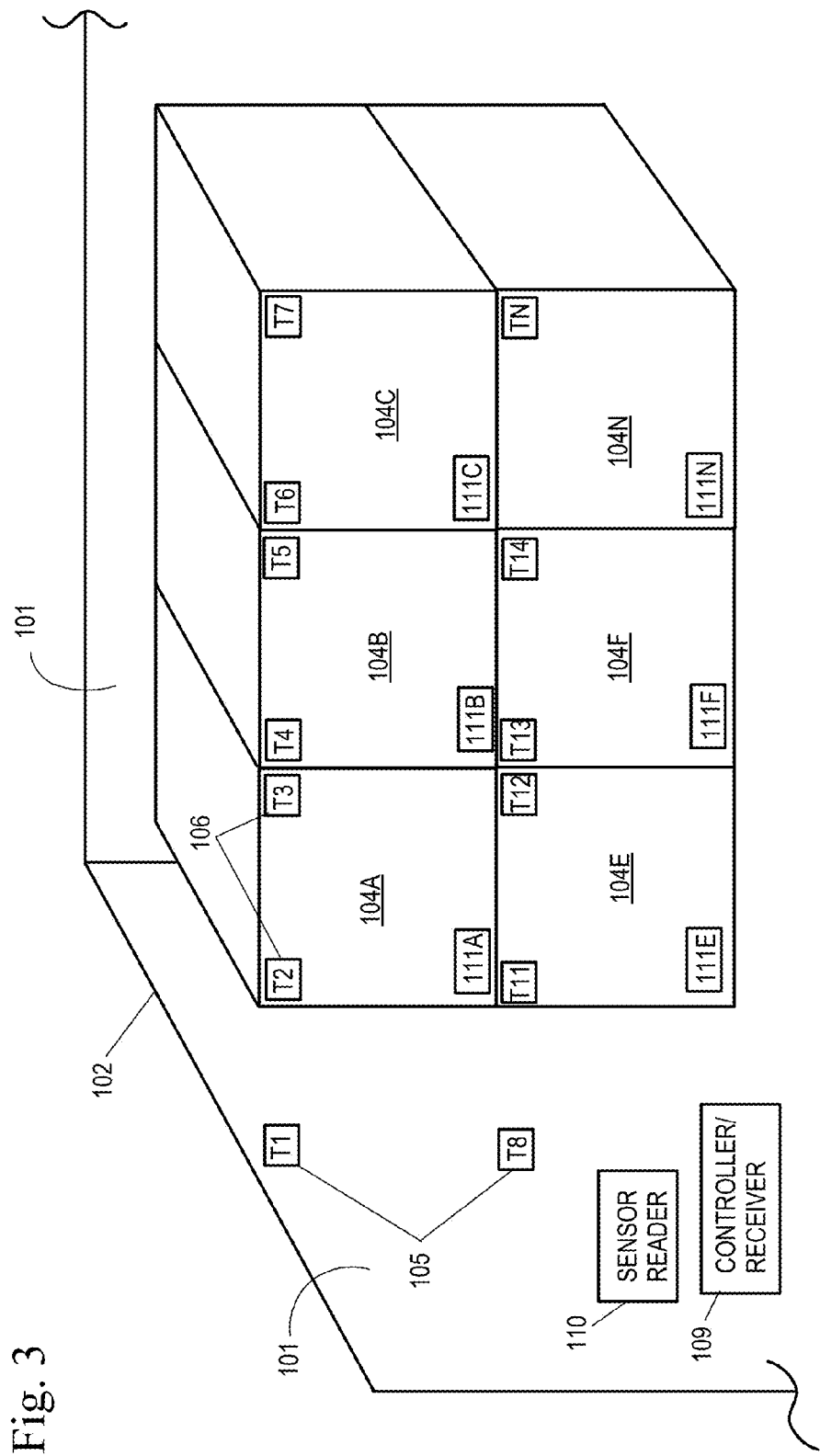
FIG. 3 shows a schematic of position of a parcel in regards to signal strength.
Figure 10:
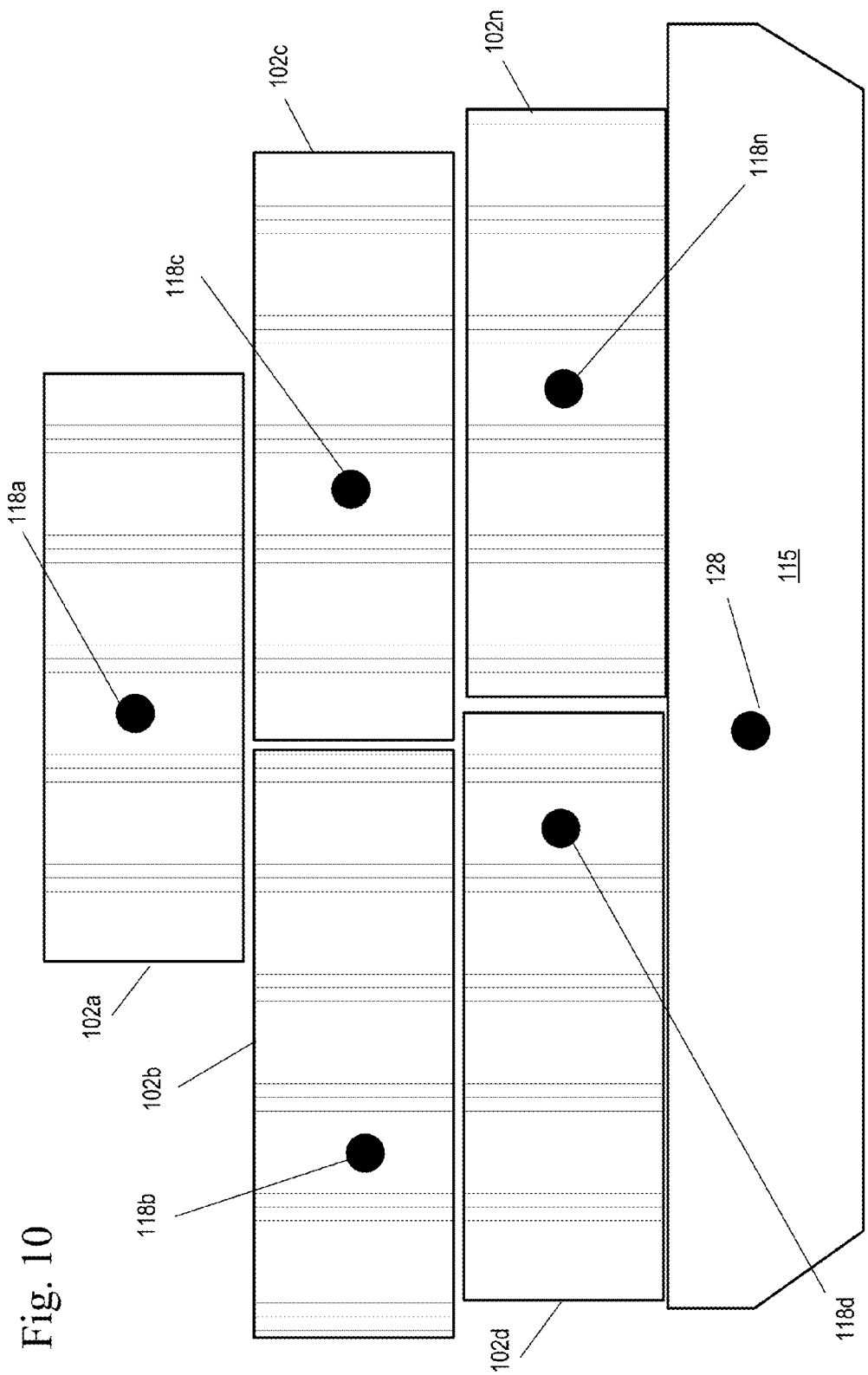
FIG. 10 shows a schematic of multiple containers with center of gravity displayed on a vessel as displayed on the personal imaging device to a user.

FIG. 3 shows a schematic of position of a parcel in regards to signal strength. A partial view of a container 102 containing a plurality of parcels 104a-104n is shown. The location and size of the container 102 is known. It should be noted that while one container is shown in this figure, multiple containers 102a-102n are present on a cargo vessel 115 as shown in FIG. 10. The walls 101 of the container 102 preferably include sensors or tags 105 and at least one sensor reader 110. Additionally, each of the parcels 104a-104n preferably has sensors or tags 106 and a sensor reader 111a-111n.

In one embodiment, each of the parcels 104a-104n preferably has at least two tags 106 and a sensor reader 111a-111n. A sensor reader 110 is also present within the container 102 and a sensor reader may be present on each of the walls 101 of the container. The sensor readers 110, 111a-111n may be in direct communication with the server computer 54. Each of the tags T1-TN has the same signal strength. Alternatively, RFID technology may be used.

The signal strength of each parcel 104a-104n is measured relative to the tags 105 in the container 102 and the tags 106 in the adjacent parcels 104a-104n. Based on the signal strength from each of the tags 105 in the container 102 and in the parcels 104a-104n, the location of the parcel in the container 102 and relative to other parcels may be determined. The strength of the signal of the tags 106 in the parcels 104a-104n may be measured using near field communication (NFC) technology.

In an alternate embodiment, the container 102 may further include a controller or receiver 109 for receiving the signals from the tags 106 of the parcels 104a-104n and the tags 105 on the walls 101 of the container 102. The controller 109 can then send all of the signal strengths associated with each of the parcels and the container 102 to a server computer 54.

Each of the parcels 104a-104n may additionally contain labels or bar codes to uniquely identify the parcel. The bar code may contain parcel specification information which may include, but is not limited to dimension, weight, weight range, port of departure, shipper, receiver of the parcel, customer name, cost of shipping the parcel, cost of the contents of the parcel, whether a hazardous material is present within the parcel, contents of the parcel, or other metadata regarding the parcel, etc. In an alternate embodiment, the signal from the tags or sensors T1-TN may include parcel specification information. The parcel specification information may be stored in a repository, for example repository 53.

It should be noted that a user of the personal imaging system 52 may submit a query related to the parcel or any of its metadata through a mobile device or the personal imaging system itself. The query is sent to the server computer 54, and parcel position program 66 may search the repository 53. The results of the search may be sent from the server computer 54 to the personal imaging system 52 and shown in a visualization presented through the display 85 of the personal imaging system 52 to the user.

Figure 9:
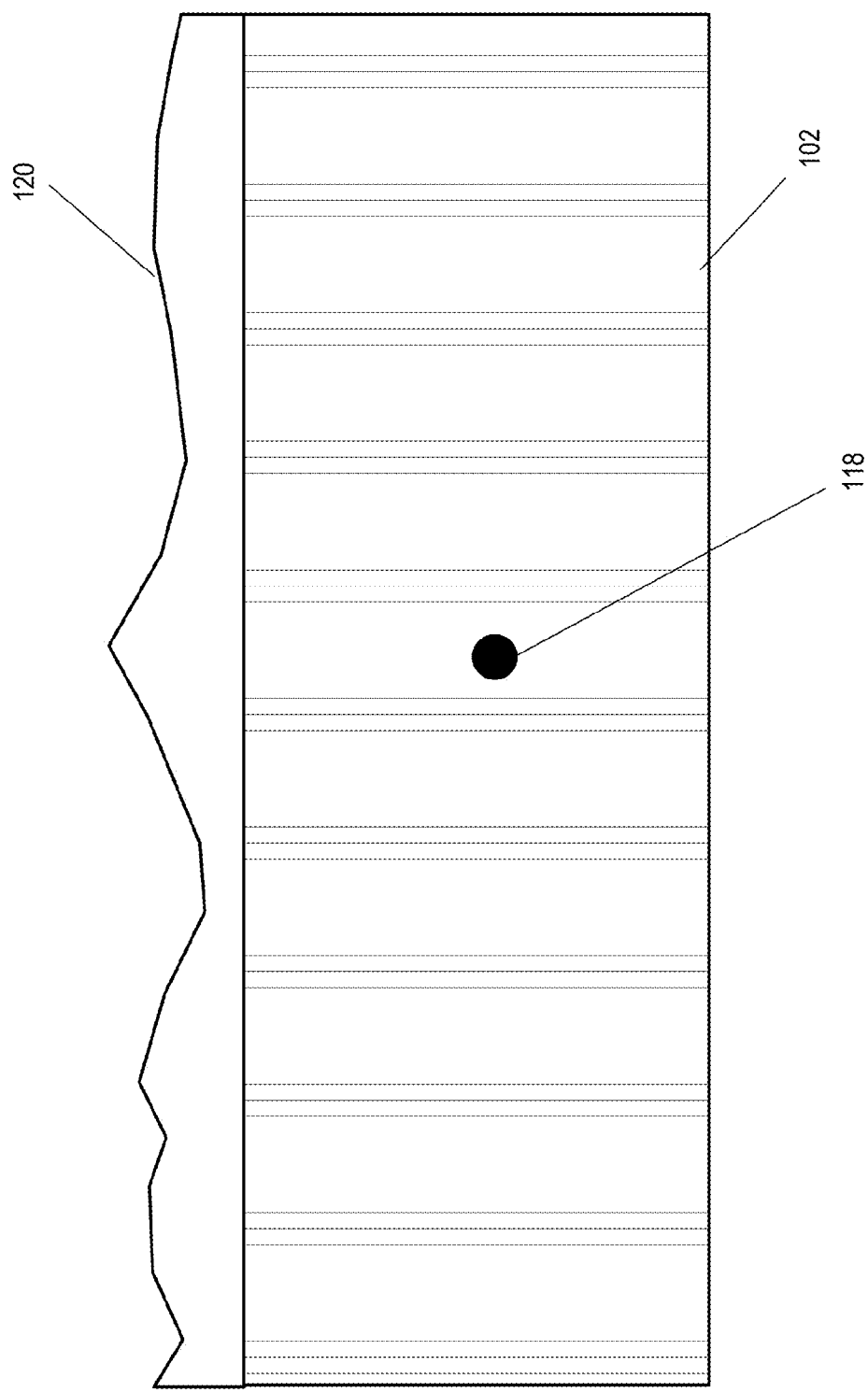
FIG. 9 shows a schematic of a container with a load diagram and center of gravity of a container as displayed on the personal imaging device to a user.

In one example, if weight is searched for by the user, a visualization of the search results is displayed to the user through the personal imaging system and may include the center of gravity of each parcel to provide the user with the load distribution of weight 120 of all of the parcels 104a-104n in the container 102 and a center of gravity 118 of the entire container 102 as calculated by a parcel position program 66 of the server computer 54. An example of visualization of a center of gravity 118 (indicated by the solid circle) of a container 102 and a load distribution of parcels 120 within the container 102 provided to a user of the personal imaging system 52 is shown in FIG. 9.

Additionally, a user can search for a specific parcel within the container, with the results being displayed to the user through the display of the personal imaging system.

Referring to FIG. 3, parcel 104a has sensors or tags T2, T3 and sensor reader 111a, parcel 104b has tags T4, T5 and sensor reader 111b, parcel 104c has tags T6, T7 and sensor reader 111c, parcel 104e has tags T11, T12 and sensor reader 111e, parcel 104f has tags T13, T14 and sensor reader 111f, parcel 104n has tags TN and sensor reader 111n. The container wall 101 has tags T1 and T8 and sensor reader 110. Since the signal strength of each tag 106 of the parcels 104a-104n would have a constant measurable signal relative to the sensor readers 110, 111a-111n in both the parcels 104a-104n and the container walls 101, the position of each parcel can be determined. The position may be further defined by the signal strength of adjacent parcels within the container.

While not shown in FIG. 3, it is understood that each of the container walls 101 would contain tags 105. Furthermore, while two tags are shown on one wall 101 of the container 102, one tag may be present. Additionally more than two tags could be present on the one wall.

Figure 6:
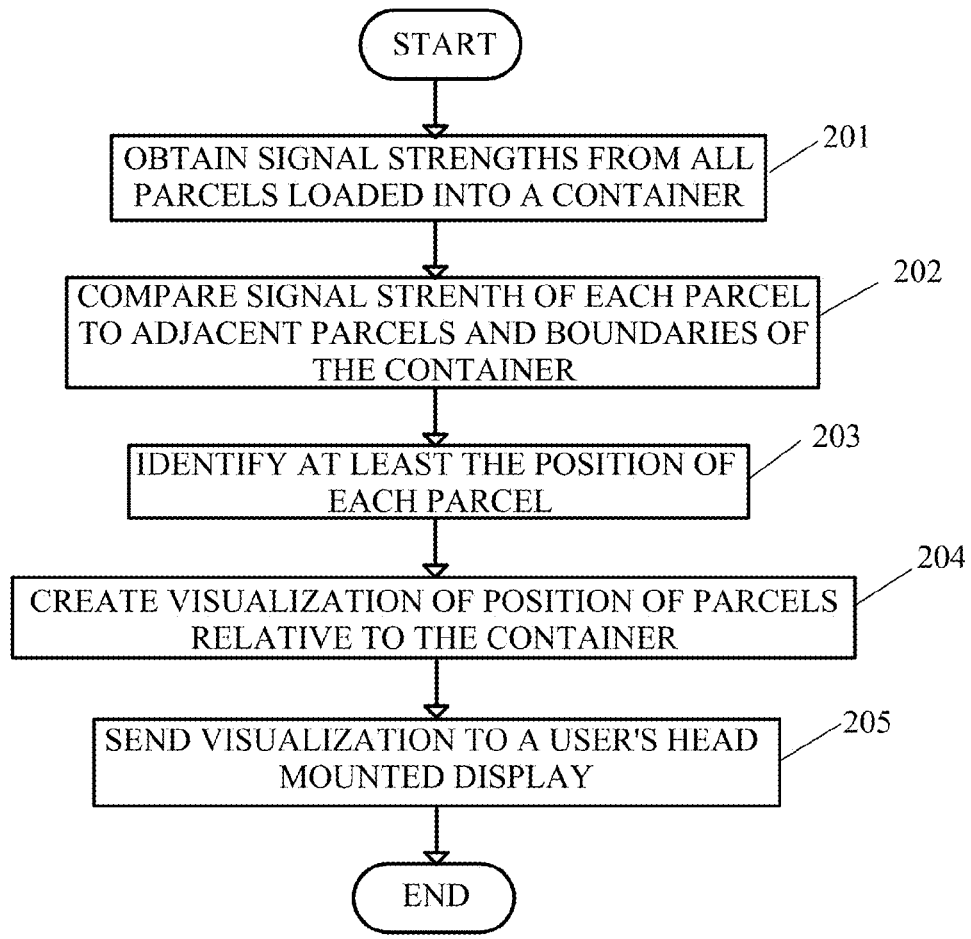
FIG. 6 shows a flow diagram of a method of identifying a position of the parcels within a container for a personal imaging device.

FIG. 6 shows a flow diagram of a method of identifying a position of the parcels within a container for a personal imaging device in real time. The identification of the position of the parcels 104a-104n may be carried out by a parcel position program 66 of a personal imaging device 52 being worn by a user or alternatively a parcel position program 66 present in a controller 109 present in the container 102 which can send the position of the parcels 104a-104n to a server computer 54 or send the signal strength of each of the tags 106 of the parcels 104a-104n relative to the tags 105 of the container walls 101 to a server computer 54 with a parcel position program 66.

In a first step, signal strengths from all parcels present in the container are obtained, for example by the parcel position program 66 (step 201). As discussed above, the signal strength may be from one tag 106 present on the parcel 104a-104n or more than one tag present on the parcel 104a-104n, as well as the tags 105 on the walls 101 of the container 102.

The signal strengths of each of the tags of the parcel are compared to tags in adjacent parcels and the signal strength of the tags of the container walls, for example by the parcel position program 66 (step 202).

Based on the comparison of the signal strength of the parcels relative to other parcels and the tags of the container walls, a position of each parcel in the container is identified, for example by the parcel position program 66 (step 203).

A visualization of the parcel positions in real time within the container is generated (step 204), for example by the parcel position program 66 and the visualization is sent to a parcel policy program 68 which may be displayed to a user wearing the personal imaging system (step 205).

Figure 4:
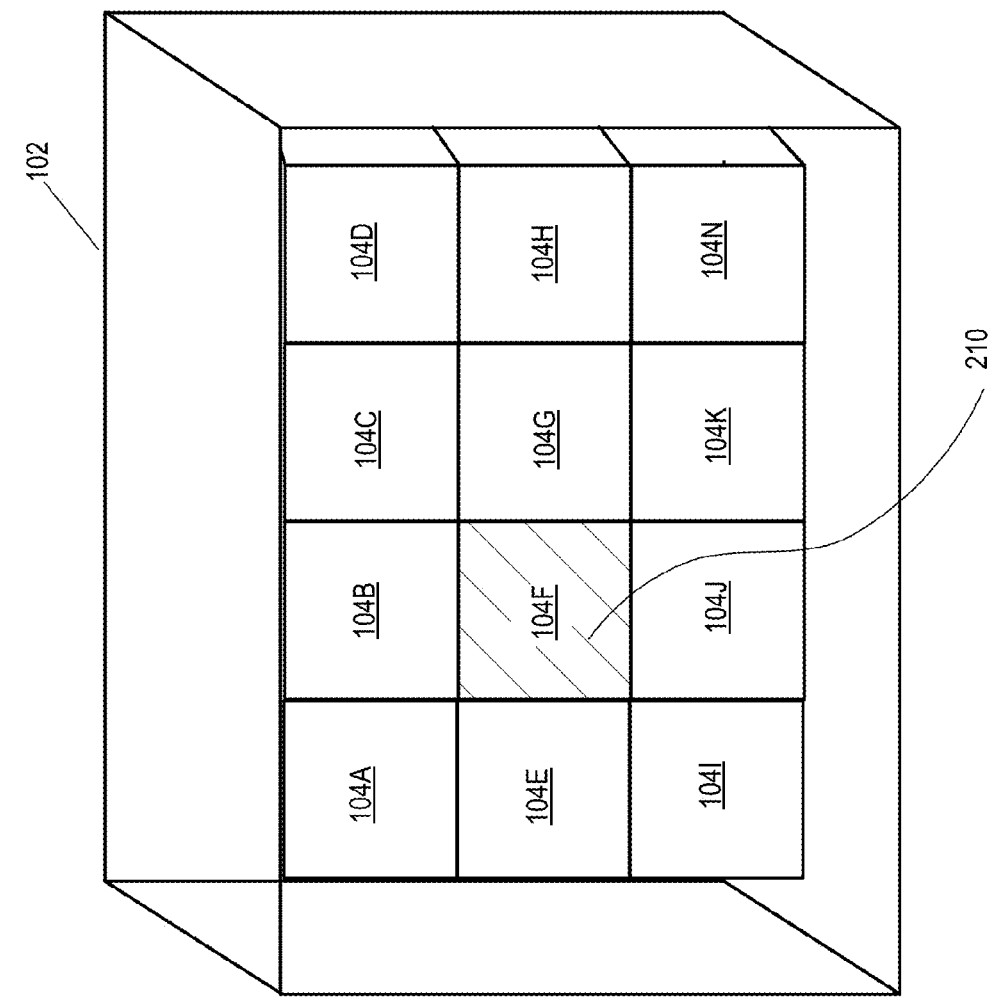
FIG. 4 shows a schematic of a container with a highlighted parcel displayed on the personal imaging device to a user.

An example of the visualization of the position of the parcels 104a-104n in real time within a container 102 with a parcel highlighted (see hatched parcel 210) is shown in FIG. 4. The visualization may contain an identification associated with the container. Additionally, the visualization may contain an identification associated with the parcels themselves and/or the container. The visualization allows the user of the personal imaging system 52 to visualize the real time position of each parcel within the container 102.

With the real time position of each parcel available within a container, a load diagram 120 of the parcels 104a-104n (omitted from FIGS. 10-11 for clarity) within the container 102 may be displayed within the visualization as shown in FIG. 9, including a center of gravity 118 of the container 102 as a whole. The visualization display through the personal imaging system 52 of the load diagram 120 to the user may be two dimensional or three dimensional. The center of gravity 118 and the load diagram 120 of the container 102 may be configured by determining the real-time position of each parcel 104a-104n as discussed above, identifying the parcel 104a-104n based on position within the container 102 and other identifying marks, looking up specifics regarding the identified parcel which includes weight, and creating a load diagram 120 to indicate the weight of the parcels 104a-104n within the container 102 based on their real time position.

The center of gravity of a parcel or the object's weight distribution, the center of gravity of a container and of a cargo vessel containing containers with parcels may be determined by calculating the weight of the object, calculating any additional weights, determine a datum, measure the datum's distance from the center of the object as well as from any additional weights, multiply each object's distance from the datum by its weight to find its moment, add the moments, add the weights of all of the objects, and divide by the total weight or other methods conventional to the art, for example by the parcel policy program 68 or the parcel position program 66.

In another embodiment, the visualization, as shown in FIG. 10, provides a view of the center of gravity 118a-118n of a plurality of containers 102a-102n on a cargo vessel 115 in which the containers are being shipped on. The visualization may include an overall center of gravity 128 of the cargo vessel 115 based on a load distribution calculated from the center of gravity 118a-118n of the containers 102a-102n.

Figure 11:
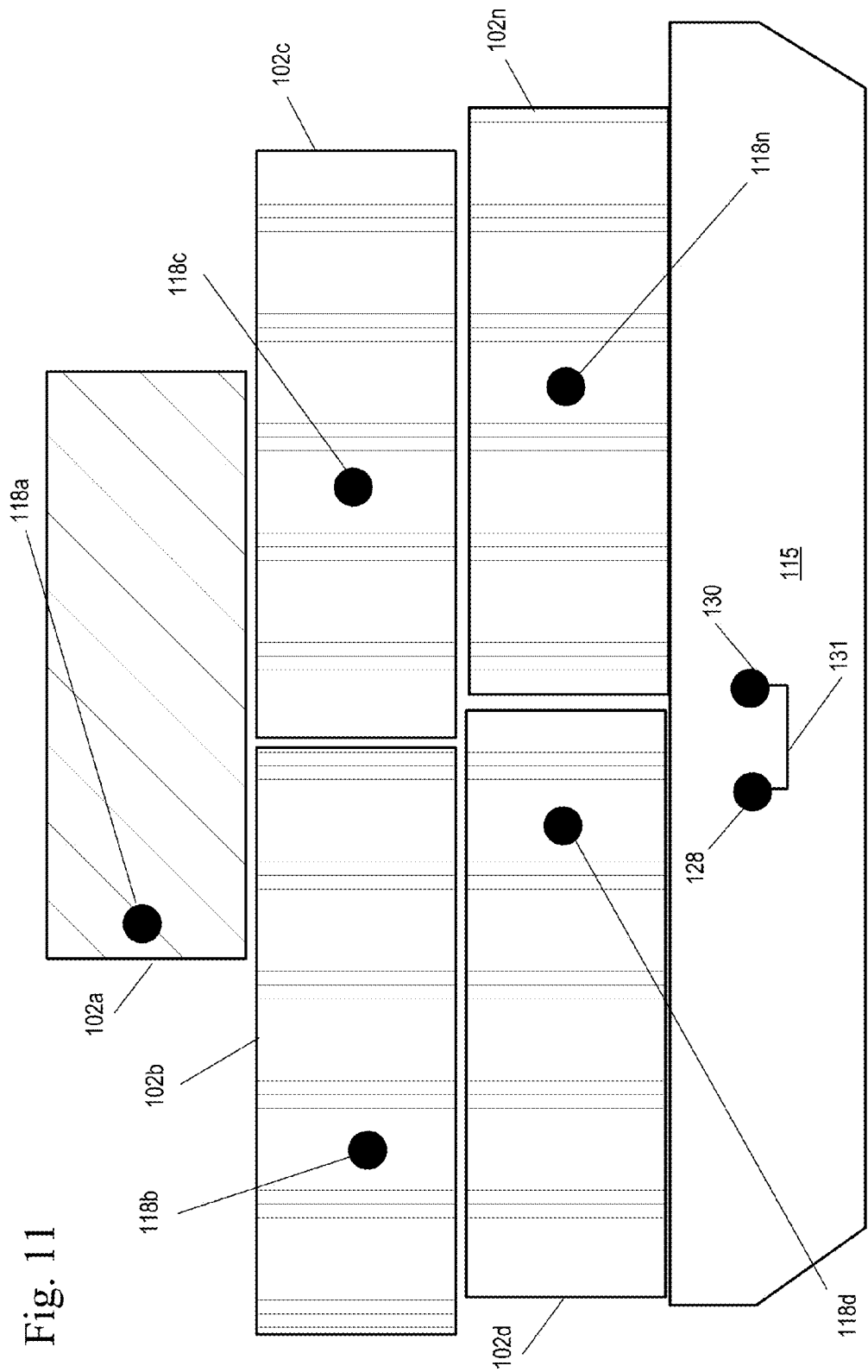
FIG. 11 shows a schematic of multiple containers with center of gravity displayed on a vessel with a required and an actual center of gravity as displayed on the personal imaging device to a user.

Based on the load distribution of the cargo vessel 115, based on the center of gravity of the containers 102a-102n, the parcel policy program 68 may provide suggestions as to where a container may be moved to, to alter the center of gravity 130 of the cargo vessel 115 required for sailing. Referring to FIG. 11, the center of gravity of 118a-118n for each of the individual containers 102a-102n loaded onto the cargo vessel is calculated, for example by the parcel policy program 68. The actual center of gravity 128 of the cargo vessel 115 is also calculated based on the current position of the containers 102a-102n. The actual center of gravity 128 of the cargo vessel 115 may be compared to a set or required center of gravity 130 for sailing of the cargo vessel 115 and the deviation 131 between the actual center of gravity 128 of the cargo vessel 115 and the required center of gravity 130 is determined, for example by the parcel policy program 68. Based on the deviation 131 between the actual center of gravity 128 of the cargo vessel 115 and the required center of gravity 130, the parcel policy program 68 can provide recommendations through the display of a user wearing the personal imaging system 52. For example, in FIG. 11, the display to the user may indicate that to correct for the deviation 131 between the actual center of gravity 128 of the cargo vessel 115 and the required center of gravity 130 of the vessel 115, the container 102a needs to be shifted to alter the actual center of gravity 128 to match the required center of gravity 130 prior to sailing. The indication as to which container needs to be moved may be achieved by highlighting the container 102a.

Alternatively, the parcel policy program 68 may be present on the server computer 54.

Figure 7:
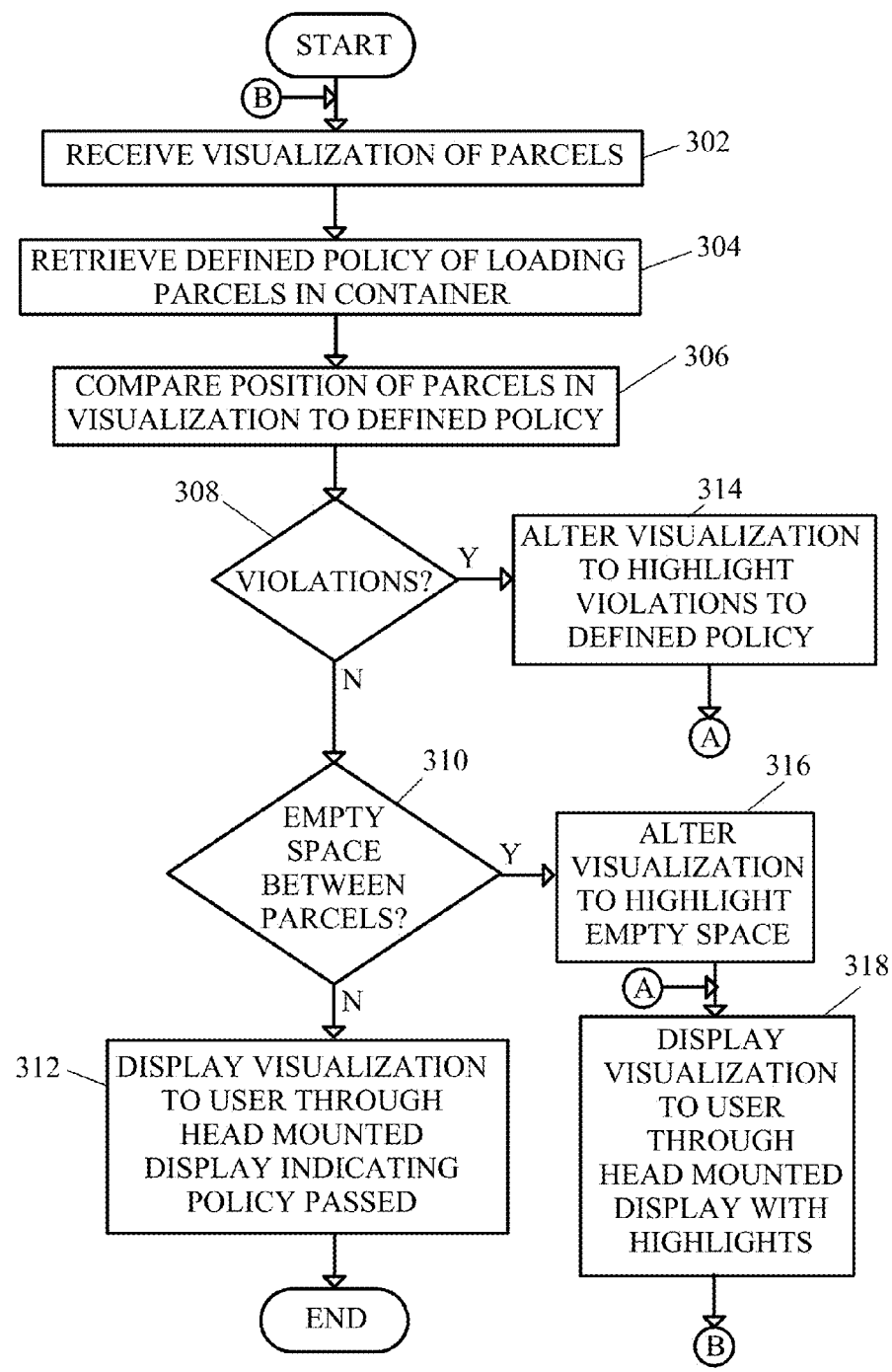
FIG. 7 shows a flow diagram of a method of using a personal imaging device to check for shipping compliance of parcels within a container.

FIG. 7 shows a flow diagram of a method of using a personal imaging device to check for shipping compliance of parcels within a container in real time.

In a first step, the personal imaging system receives the visualization of the parcels and the position of the parcels relative to the container (step 302), for example by the parcel policy program 68.

The parcel policy program 68 retrieves a defined policy regarding how the parcels are to be loaded in the container (step 304). The policy may be specific to the company shipping the parcels, the company receiving the shipment of the parcels, type of container, size of container, number of parcels, type of good being transported within the parcels and/or other criteria. The policy may also include position of the center of gravity of containers relative to the cargo vessel.

The position of the parcels and the visualization of the parcels is compared to the retrieved policy regarding the parcels (step 306), for example by the parcel policy program 68.

If a violation of the parcel policy is present (step, 308), the visualization of the parcels and their position is altered by highlighting the violations in the visualization (step 314) and the visualization with highlights is displayed through the personal imaging system to the user in real time (step 318) and the method returns to step 302.

It should be noted that unless the violation is resolved, the cargo vessel may not be allowed to leave dock.

An example of a parcel being highlighted for a violation is shown in FIG. 4. The violation may be that the parcel was loaded upside down or that parcels containing a type of substance were packed next to or with other parcels containing a substance that could be dangerous if mixed. A violation may also be that the container was not filled to a specific capacity with parcels. A violation may be any condition which is undesired by the shipper or the receiver of the shipment of parcels. After step 314, the method continues to step 318.

If a violation is not present (step 308), the visualization of the parcels within the container is checked to determine whether any space is present between parcels (step 310).

If empty space is detected (step 310), the visualization of the parcels is altered to highlight the empty space between the parcels (step 316) and the visualization with highlights is displayed through the personal imaging system to the user in real time (step 318) and the method returns to step 302. An advantage of removing the empty space between parcels is to prevent vibration, or shaking or parcels which can prevent damage of the parcels. By visually identifying the empty space, a user may rearrange the parcels to reduce the empty space or may fill the empty space with a material that acts as shock absorber, such as blister paper. In an alternate embodiment, based on the empty space, the parcel position program 66 of the parcel policy program 68 may recommend a position within the container for the parcel to reduce the empty space.

Figure 5A:
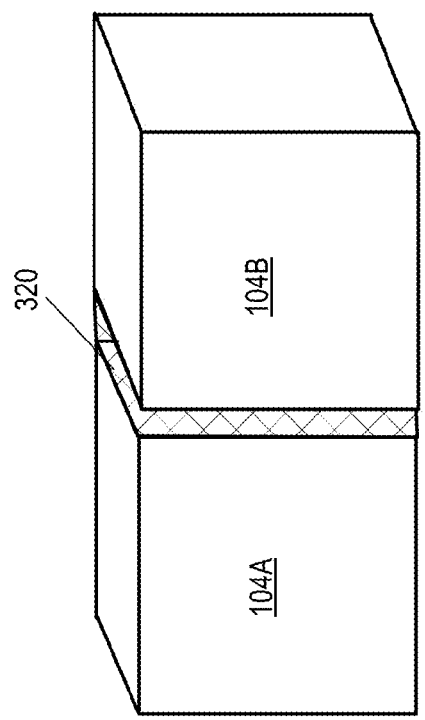
FIG. 5A shows a schematic of a constant gap present between parcels within a container.

For example, in FIG. 5A, the empty space is a gap 320 present between adjacent parcels 104a, 104b and is a constant gap from the front of the parcel to the back of the parcel. The gap 320 is highlighted (shown by the cross-hatched area) within the visualization being displayed on the personal imaging system 52 to the user in real time.

Figure 5B:
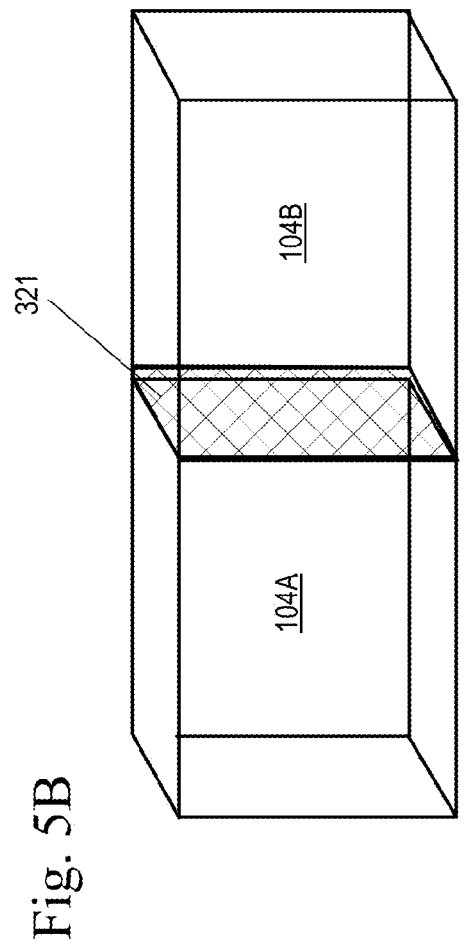
FIG. 5B shows a schematic of a gap present between adjacent parcels within a container present at the back of the parcels only.

In FIG. 5B, the empty space is the gap 321 present between adjacent parcels 104a, 104b at the back of the parcels only. The gap 321 is highlighted (shown by the cross-hatched area) within the visualization being displayed on the personal imaging system 52 to the user in real time.

The amount of empty space between the parcels that is considered a violation of the parcel policy may be defined within the parcel policy. It should be noted that some empty space is inevitable.

If there is no empty space between the parcels (step 310), an indication is presented with the visualization displayed to the user in real time through the personal imaging system regarding the compliance of the parcels in the container with the parcel policy (step 312) and the method ends.

It should be noted that the visualization may be sent to the server computer 54 which then relays the visualization to the personal imaging system 52. Alternatively, the method of FIG. 7 may be carried out by the parcel position program 66.

FIG. 8 illustrates internal and external components of a personal imaging device 52 and server computer 54 in which illustrative embodiments may be implemented. In FIG. 8, a personal imaging device 52 and a server computer 54, include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, parcel position program 66, parcel policy program 68, and sensor data capture program 67 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Parcel position program 66, parcel policy program 68, and sensor data capture program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Parcel position program 66, parcel policy program 68, and sensor data capture program 67 can be downloaded to the personal imaging device 52 and server computer 54 from an external computer via a network (for example, the Internet, a local area network or other, wide area network) and network adapter or interface 836. From the network adapter or interface 836, parcel position program 66, parcel policy program 68, and sensor data capture program 67 are loaded into hard drive 830. Parcel position program 66 and parcel policy program 68 can be downloaded to the server computer 54 from an external computer via a network (for example, the Internet, a local area network or other, wide area network) and network adapter or interface 836. From the network adapter or interface 836, parcel position program 66 and parcel policy program 68 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Parcel position program 66, parcel policy program 68, and sensor data capture program 67 can be written in various programming languages including low-level, high-level, object-oriented or non object-oriented languages. Alternatively, the functions of a parcel position program 66, a parcel policy program 68, and a sensor data capture program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining positions of parcels within a container, the parcels each comprising at least two parcel sensors and a parcel sensor reader and the container comprising at least two container wall sensors and a container sensor reader, the method comprising the steps of:
   a computer obtaining a received signal strength collected from the parcel sensor reader in each parcel loaded into the container, the signal strength indicative of a positional distance between each parcel sensor and parcel sensor reader within all of the parcels loaded into the container;
   the computer obtaining a received signal strength collected from the container sensor reader in the container, the signal strength indicative of a positional distance between each container sensor on container walls of the container and each parcel sensor in the parcels loaded into the container;
   the computer comparing the received signal strengths of each parcel to other parcels and to the received signal strengths of the sensors on the walls of the container;
   the computer identifying a position of the parcels within the container relative to other parcels and the walls of the container;
   the computer creating a visualization of the position of the parcels within the container; and
   the computer sending the visualization to a user.

2. The method of claim 1, wherein the visualization is received by a personal imaging system of the user.

3. The method of claim 1, wherein the received signal from the parcel sensors further comprises specification information regarding the parcel.

4. The method of claim 3, wherein the specification information is selected from the group consisting of: weight, dimension, port of departure, shipper of the parcel, receiver of the parcel, cost of shipping the parcel, cost of the items within the parcel, whether hazardous material is present and contents of the parcel.

5. The method of claim 1, wherein the computer is a server computer connected to a repository via a network.

6. The method of claim 1, further comprising the steps of:
   a personal imaging system receiving the visualization of the position of the parcels within the container;
   the personal imaging system retrieving a defined policy regarding a loading of the parcels within a container for shipment;
   the personal imaging system comparing the position of the parcels to the defined policy; and
   if violations to the policy regarding position of the parcels is detected, altering the visualization of the parcels to highlight the violations in real-time through a display of the personal imaging system to a user.

7. The method of claim 6, wherein the violations to the policy further comprises an excess of empty space between parcels.

8. The method of claim 6, wherein the violations to the policy further comprises placement of hazardous materials relative to other parcels.

9. A computer program product for determining positions of parcels within a container, the parcels each comprising at least two parcel sensors and a parcel sensor reader and the container comprising at least two container wall sensors and a container sensor reader, the parcel sensor reader and the container sensor reader in communication with a computer comprising at least one processor, one or more memories, one or more computer readable storage media, the computer program product comprising a computer readable storage medium having program instructions embodied therewith, the program instructions executable by the computer to perform a method comprising:
   obtaining, by the computer, a received signal strength collected from the parcel sensor reader in each parcel loaded into the container, the signal strength indicative of a positional distance between each parcel sensor and parcel sensor reader within all of the parcels loaded into the container;
   obtaining, by the computer, a received signal strength collected from the container sensor reader in the container, the signal strength indicative of a positional distance between each container sensor on container walls of the container and each parcel sensor in the parcels loaded into the container;
   comparing, by the computer, the received signal strengths of each parcel to other parcels and to the received signal strengths of the sensors on the walls of the container;
   identifying, by the computer, a position of the parcels within the container;
   creating, by the computer, a visualization of the position of the parcels within the container; and
   sending, by the computer, the visualization to a user.

10. The computer program product of claim 9, wherein the visualization is received by a personal imaging system of the user.

11. The computer program product of claim 9, wherein the received signal from the parcel sensors further comprises specification information regarding the parcel.

12. The computer program product of claim 11, wherein the specification information is selected from the group consisting of: weight, dimension, port of departure, shipper of the parcel, receiver of the parcel, cost of shipping the parcel, cost of the items within the parcel, whether hazardous material is present and contents of the parcel.

13. The computer program product of claim 9, wherein the computer is a server computer connected to a repository via a network.

14. The computer program product of claim 9, further comprising the program instructions of:
receiving, by a personal imaging system, the visualization of the position of the parcels within the container;
retrieving, by the personal imaging system, a defined policy regarding a loading of the parcels within a container for shipment;
comparing, by the personal imaging system, the position of the parcels to the defined policy; and
if violations to the policy regarding position of the parcels is detected, altering, by the personal imaging system, the visualization of the parcels to highlight the violations in real-time through a display of the personal imaging system to a user.

15. The computer program product of claim 14, wherein the violations to the policy further comprises an excess of empty space between parcels.

16. The computer program product of claim 14, wherein the violations to the policy further comprises placement of hazardous materials relative to other parcels.

17. A computer system for determining positions of parcels within a container, the parcels each comprising at least two parcel sensors and a parcel sensor reader and the container comprising at least two container wall sensors and a container sensor reader, the parcel sensor reader and the container sensor reader in communication with the computer system comprising a computer comprising at least one processor, one or more memories, one or more computer readable storage media having program instructions executable by the computer to perform the program instructions comprising:
obtaining, by the computer, a received signal strength collected from the parcel sensor reader in each parcel loaded into the container, the signal strength indicative of a positional distance between each parcel sensor and parcel sensor reader within all of the parcels loaded into the container;
obtaining, by the computer, a received signal strength collected from the container sensor reader in the container, the signal strength indicative of a positional distance between each container sensor on container walls of the container and each parcel sensor in the parcels loaded into the container;
comparing, by the computer, the received signal strengths of each parcel to other parcels and to the received signal strengths of the sensors on the walls of the container;
identifying, by the computer, a position of the parcels within the container;
creating, by the computer, a visualization of the position of the parcels within the container; and
sending, by the computer, the visualization to a user.

18. The computer system of claim 17, further comprising the program instructions of:
receiving, by a personal imaging system, the visualization of the position of the parcels within the container;
retrieving, by the personal imaging system, a defined policy regarding a loading of the parcels within a container for shipment;
comparing, by the personal imaging system, the position of the parcels to the defined policy; and
if violations to the policy regarding position of the parcels is detected, altering, by the personal imaging system, the visualization of the parcels to highlight the violations in real-time through a display of the personal imaging system to a user.

19. The computer system of claim 18, wherein the violations to the policy further comprises an excess of empty space between parcels.

20. The computer system of claim 18, wherein the violations to the policy further comprises placement of hazardous materials relative to other parcels.

* * * * *